United States Patent
Maniar et al.

(10) Patent No.: US 10,814,911 B2
(45) Date of Patent: Oct. 27, 2020

(54) IMPLEMENT STEERING SYSTEM

(71) Applicant: CNH Industrial America LLC, New Holland, PA (US)

(72) Inventors: Alihaider Maniar, Skokie, IL (US); Marvin A. Prickel, Homer Glen, IL (US); Shivakumar Prodduturi, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 239 days.

(21) Appl. No.: 15/903,143

(22) Filed: Feb. 23, 2018

(65) Prior Publication Data
US 2018/0178837 A1 Jun. 28, 2018

Related U.S. Application Data

(62) Division of application No. 15/093,325, filed on Apr. 7, 2016, now Pat. No. 9,926,007.

(51) Int. Cl.
*B62D 11/20* (2006.01)
*B62D 13/00* (2006.01)
(Continued)

(52) U.S. Cl.
CPC ............ *B62D 11/20* (2013.01); *A01B 69/004* (2013.01); *B62D 5/28* (2013.01); *B62D 13/005* (2013.01); *F15B 15/149* (2013.01)

(58) Field of Classification Search
CPC .................................. B62D 11/20; B62D 5/28
See application file for complete search history.

(56) References Cited

U.S. PATENT DOCUMENTS 3,834,480 A 9/1974 McGee
4,006,664 A 2/1977 Brown
(Continued)

FOREIGN PATENT DOCUMENTS

CN 103043096 4/2013
EP 0700821 3/1996
(Continued)

OTHER PUBLICATIONS

Kenneth D. Rosenbecker; "Getting your system in Sync Part 2"; Energy Mfg. Co.; Jul. 13, 2006; http://hydraulicspneumatics.com/200/TechZone/Cylinders/Article/False/21797/TechZone-Cylinders last access Apr. 6, 2016, 4 pgs.

(Continued)

*Primary Examiner* — Kevin Hurley
(74) *Attorney, Agent, or Firm* — Rebecca L. Henkel; Rickard K. DeMille

(57) ABSTRACT

In one embodiment, a steering system for an agricultural implement system includes a first actuating cylinder configured to rotate a first track relative to an implement frame where the first actuating cylinder is connected to a first frame of the first track, and a second actuating cylinder configured to rotate a second track relative to the implement frame where the second actuating cylinder is connected to a second frame of the second track. The steering system also includes a first fluid control conduit extending to a cap end of the first actuating cylinder, a second fluid control conduit extending between a rod end of the first actuating cylinder and a rod end of the second actuating cylinder, a third fluid control conduit extending to a cap end of the second actuating cylinder, and a steering control valve in fluid communication with the first and third fluid control conduits.

5 Claims, 5 Drawing Sheets

(51) Int. Cl.
*A01B 69/00* (2006.01)
*B62D 5/28* (2006.01)
*F15B 15/14* (2006.01)

(56) References Cited

U.S. PATENT DOCUMENTS

| | | | |
|---|---|---|---|
| 4,029,165 A | 6/1977 | Miller et al. | |
| 4,120,507 A | 10/1978 | Miller | |
| 4,212,483 A | 7/1980 | Howard | |
| 4,566,553 A | 1/1986 | McCutcheon | |
| 4,771,851 A | 9/1988 | Nystuen et al. | |
| 5,191,952 A | 3/1993 | Satzler et al. | |
| 5,295,554 A | 3/1994 | Cullen | |
| 5,364,116 A | 11/1994 | Houle et al. | |
| 5,435,407 A | 7/1995 | Renfroe | |
| 5,438,515 A | 8/1995 | Miichi et al. | |
| 5,590,977 A | 1/1997 | Guntert et al. | |
| 5,931,244 A | 8/1999 | Renfroe et al. | |
| 5,964,814 A | 10/1999 | Muller et al. | |
| 6,164,399 A | 12/2000 | Bays | |
| 6,185,485 B1 | 2/2001 | Ashrafi et al. | |
| 6,431,576 B1 | 8/2002 | Viaud et al. | |
| 7,127,340 B2 | 10/2006 | Schick et al. | |
| 7,147,241 B2 | 12/2006 | Beaujot et al. | |
| 7,322,190 B2 | 1/2008 | Bair | |
| 7,447,585 B2 | 11/2008 | Tandy, Jr. et al. | |
| 7,673,883 B2 | 3/2010 | Damm | |
| 7,694,993 B2 | 4/2010 | Timmons, Jr. | |
| 7,731,302 B2 | 6/2010 | Tandy, Jr. et al. | |
| 7,798,263 B2 | 9/2010 | Tandy, Jr. et al. | |
| 7,810,823 B2 | 10/2010 | Van Miller et al. | |
| 7,849,932 B2 | 12/2010 | Friggstad et al. | |
| 7,942,604 B2 | 5/2011 | Willis et al. | |
| 8,342,255 B2 | 1/2013 | Connors et al. | |
| 8,428,831 B2 | 4/2013 | Thompson et al. | |
| 8,469,114 B1 | 6/2013 | Borkgren | |
| 8,640,785 B2 | 2/2014 | Diaz et al. | |
| 8,700,269 B2 | 4/2014 | Hubalek | |
| 8,727,047 B2 | 5/2014 | Janzen et al. | |
| 8,914,198 B2 | 12/2014 | Prickel et al. | |
| 9,037,346 B2 | 5/2015 | Keys, II et al. | |
| 9,096,264 B2 | 8/2015 | Connors | |
| 9,464,716 B2 * | 10/2016 | Farr | B62D 5/26 |
| 9,682,736 B1 | 6/2017 | Prickel | |
| 9,688,322 B1 | 6/2017 | Prickel | |
| 9,764,762 B2 * | 9/2017 | Klein | B62D 11/20 |
| 2006/0266151 A1 | 11/2006 | Avers et al. | |
| 2008/0217093 A1 | 9/2008 | Foxwell | |
| 2009/0032273 A1 | 2/2009 | Hanh | |
| 2009/0095587 A1 | 4/2009 | Rowan et al. | |
| 2011/0175322 A1 | 7/2011 | McMahon et al. | |
| 2013/0269511 A1 | 10/2013 | Lemke et al. | |
| 2014/0262378 A1 * | 9/2014 | Connors | B62D 13/005 |
| | | | 172/387 |
| 2015/0014961 A1 | 1/2015 | Struyk | |
| 2015/0232088 A1 | 8/2015 | Tagesson et al. | |
| 2015/0321708 A1 | 11/2015 | Van Mill et al. | |
| 2015/0367901 A1 | 12/2015 | Studer | |
| 2016/0362149 A1 | 12/2016 | Erlinger | |
| 2017/0106902 A1 * | 4/2017 | Farr | B62D 5/26 |
| 2018/0338413 A1 * | 11/2018 | Connell | B62D 55/12 |

FOREIGN PATENT DOCUMENTS

| | | |
|---|---|---|
| EP | 1302434 | 4/2003 |
| GB | 819266 | 9/1959 |

OTHER PUBLICATIONS

"Rephasing Type Hydraulic Cylinders"; Energy Manufacturing Company Inc.; http://www.energymfg.com/products/rephasing-hydraulic-cylinders.html; last access Apr. 6, 2016, 2 pgs.

* cited by examiner

IMPLEMENT STEERING SYSTEM

CROSS-REFERENCE TO RELATED APPLICATION

This application is a divisional of U.S. patent application Ser. No. 15/093,325, entitled "IMPLEMENT STEERING SYSTEM", filed Apr. 7, 2016, which is hereby incorporated by reference in its entirety.

BACKGROUND

The present disclosure relates generally to ground working equipment, such as agricultural equipment, and more specifically, to a fluid control system for a steerable agricultural implement.

A wide range of farm implements have been developed and are presently in use for tilling, planting, harvesting, and so forth. Seeders or planters, for example, are commonly towed behind tractors and may cover wide swaths of soil which may be tilled or untilled. Such devices typically open the soil, dispense seeds in the opening, and close the soil as the implement traverses a field. Oftentimes, the implement includes a steering system to control movement of wheels and/or tracks of the implement as the implement traverses the field. Typical steering systems include a mechanical linkage (e.g., tie rod system) extending between two rotating elements (e.g., wheels or tracks) of the implement to transmit motion between the two rotating elements and/or to synchronize the orientation of the two rotating elements. Based on the application, a tie rod system may be complex and costly. When the implement steering system directs the implement through certain portions of the field, the implement rotating elements may rotate about numerous axes and through a broad range of motion. Unfortunately, the tie rod system may limit the degree of rotation of the rotating elements. Further, the tie rod system usually consists of numerous parts, which may increase service costs and the frequency of maintenance operations.

BRIEF DESCRIPTION

In one embodiment, a steering system for an agricultural implement system includes a first actuating cylinder configured to rotate a first track relative to an implement frame. The first actuating cylinder is connected to a first frame of the first track. The steering system also includes a second actuating cylinder configured to rotate a second track relative to the implement frame. The second actuating cylinder is connected to a second frame of the second track. The steering system also includes a first fluid control conduit extending to a cap end of the first actuating cylinder, a second fluid control conduit extending between a rod end of the first actuating cylinder and a rod end of the second actuating cylinder, a third fluid control conduit extending to a cap end of the second actuating cylinder, and a steering control valve in fluid communication with the first and third fluid control conduits. The steering control valve is configured to control fluid flow to the cap end of the first actuating cylinder and to the cap end of the second actuating cylinder via the first and third fluid conduits, respectively.

In one embodiment, an agricultural implement system includes a first actuating cylinder configured to rotate a first track relative to an implement frame. The first actuating cylinder is connected to a first frame of the first track. The agricultural implement system also includes a second actuating cylinder configured to rotate a second track relative to the implement frame. The second actuating cylinder is connected to a second frame of the second track. The agricultural implement system also includes a first fluid supply conduit configured to supply fluid from a fluid supply to a three-position valve or return fluid to the fluid supply from the three-position valve, a second fluid supply conduit configured to supply fluid from the fluid supply to the three-position valve or return fluid to the fluid supply from the three-position valve, a first fluid control conduit extending to a cap end of the first actuating cylinder, a second fluid control conduit extending between a rod end of the first actuating cylinder and a rod end of the second actuating cylinder, a third fluid control conduit extending to a cap end of the second actuating cylinder. The three-position valve has a first position configured to block fluid flow between the first and second fluid supply conduits and the first and third fluid control conduits, a second position configured to facilitate fluid flow between the first fluid supply conduit and the third fluid control conduit and between the second fluid supply conduit and the first fluid control conduit, and a third position configured to facilitate fluid flow between the first fluid supply conduit and the first fluid control conduit and between the second fluid supply conduit and the third fluid control conduit. The agricultural implement system does not comprise a drive system and is configured to be towed by an agricultural vehicle in operation.

In one embodiment, an agricultural implement system includes a first actuating cylinder configured to rotate a first track relative to an implement frame. The first track comprises a main frame, a pivot member, a pivot shaft coupled to the pivot member, and the first actuating cylinder is coupled between the pivot shaft and the main frame of the first track. The agricultural implement system also includes a second actuating cylinder configured to rotate a second track relative to the implement frame. The second track comprises a main frame, a pivot member, a pivot shaft coupled to the pivot member, and the second actuating cylinder is coupled between the pivot shaft and the main frame of the second track. The agricultural implement system also includes a first fluid supply conduit configured to supply or return fluid, a second fluid supply conduit configured to supply or return fluid, a second fluid control conduit extending between a rod end of the first actuating cylinder and a rod end of the second actuating cylinder, and a steering control valve in fluid communication with the first and second actuating cylinders and the first and second fluid supply conduits. The steering control valve is configured to control fluid flow from the first and second fluid supply conduits to the first and second actuating cylinders. Each pivot member is mounted to the respective main frame of the first and second tracks to permit pivotal steering movement in a clockwise or counter-clockwise direction under the influence of the first and second actuating cylinders.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
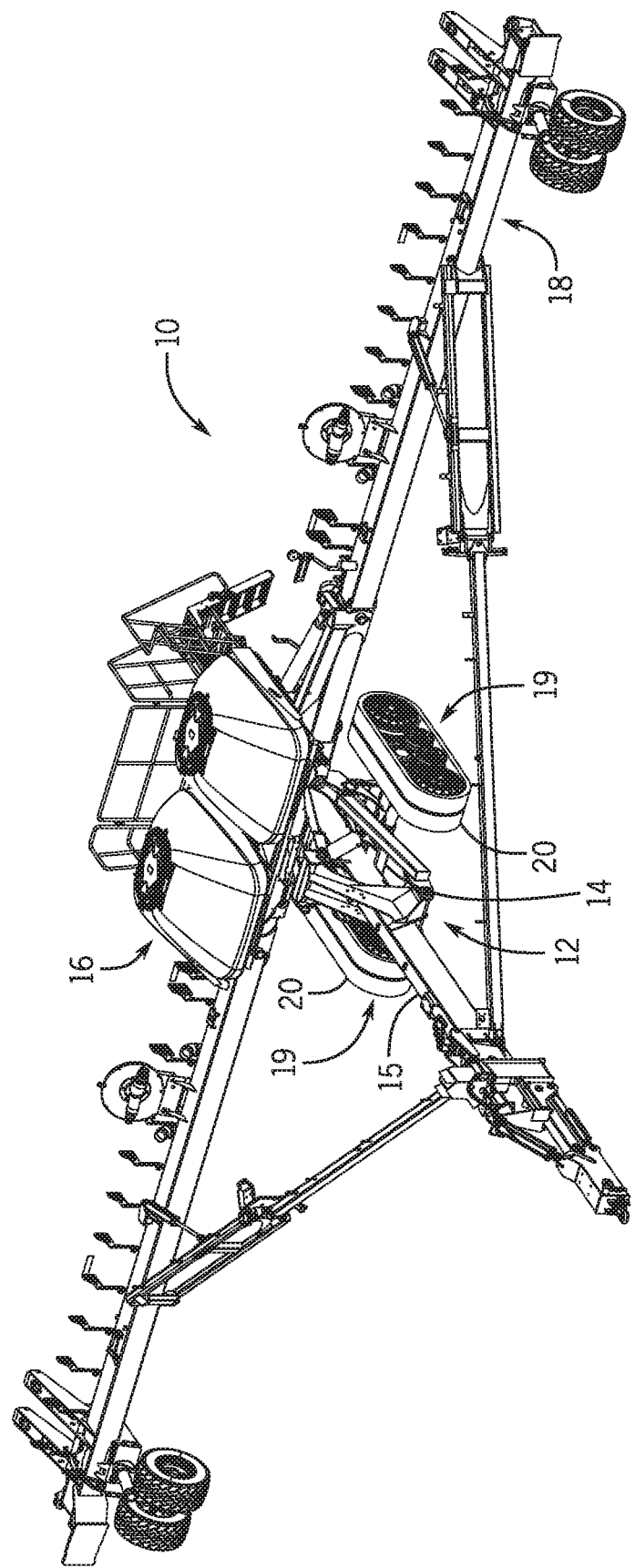
FIG. 1 is a perspective view of an agricultural implement with a steerable track assembly, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Some agricultural implements may include a steering system having mechanical linkage(s) (e.g., tie rod system(s)) that synchronize movement between rolling elements (e.g., wheels or tracks). Such tie rod system(s) may interfere with independent rotation of opposing rolling elements about certain axes. Further, the tie rod system(s) often include numerous parts that may be costly to maintain and may increase the frequency of maintenance operations.

Accordingly, the present disclosure relates generally to improving the movement of agricultural implements. In some embodiments, the tie rod system is omitted, and a track assembly that includes a steering system having synchronized actuating cylinders is used. The steering system may include a hydraulic circuit configured to transmit power between two actuating cylinders and to synchronize the orientations of the tracks of the track assembly about a vertical axis local to each track. Although hydraulic power is discussed below as controlling the track assembly, it should be understood that other forms of power may be used, such as pneumatic or the like. In general, the hydraulic circuit fluidly connects a first rod end of a first cylinder to a second rod end of a second cylinder. In addition, a cap end of the first cylinder and a cap end of the second cylinder are fluidly connected to a steering control valve that supplies hydraulic fluid to the cap end of the first cylinder, to the cap end of the second cylinder, or neither depending on position of the steering control valve. When the cap end of either cylinder receives fluid from the steering control valve, the cylinder is referred to as the working cylinder. The hydraulic circuit may enable the cylinders to move in a synchronized fashion. In some instances, hydraulic fluid may leak across the internal seal glands and cause the two cylinders to become out of phase. As such, in certain embodiments, the cylinders include phasing elements which enable a relatively small amount of hydraulic fluid to pass between the cap side and the rod side of each cylinder, or between the rod ends of the cylinders, when the working cylinder is extended or retracted to a re-phasing position (e.g., fully extended, fully retracted, etc.). The re-phasing elements enable hydraulic fluid to pass into the rod side or the cap side of the cylinders until the respective side has been replenished. The re-phasing elements enable pressurized hydraulic fluid to be transmitted throughout the hydraulic circuit and back to the tank. As such, the possibility of introducing air into the hydraulic circuit may be substantially reduced or eliminated, and hydraulic fluid that has leaked across the piston seal may be replenished to ensure that the cylinders remain synchronized.

FIG. 1 is a perspective view of an agricultural implement 10 with a steerable track assembly 12, in accordance with an embodiment of the present disclosure. The agricultural implement 10 may be any suitable type of agricultural implement, such as a cultivator, planter, fertilizer applicator, harvester, etc. It should be noted that the agricultural implement 10 is not self-powered (e.g., the agricultural implement 10 is towed in operation and does not include a motor that drives the agricultural implement 10) in the depicted embodiment. The agricultural implement 10 includes a frame 14 to which components of the agricultural implement 10 may be attached, such as the track assembly 12. The frame 14 includes a tow hitch 15 configured to connect to a tow hitch of an agricultural vehicle or directly to the agricultural vehicle. Additionally, storage tanks 16 that may store seeds, fertilizer, etc., are attached to the frame 14. Row units 18 that may be used to cultivate soil, plant seeds, apply fertilizer, etc., are also attached to the frame 14. The frame 14 may be configured to enable the agricultural implement 10 to be towed by an agricultural vehicle, such as a tractor. As depicted, the track assembly 12 includes two rolling elements 19 (e.g., tracks) with respective track belts 20 that enable the agricultural implement 10 to travel on a variety of terrain. The track assembly 12 also includes additional components that are more specifically described below with reference to FIG. 2.

Figure 2:
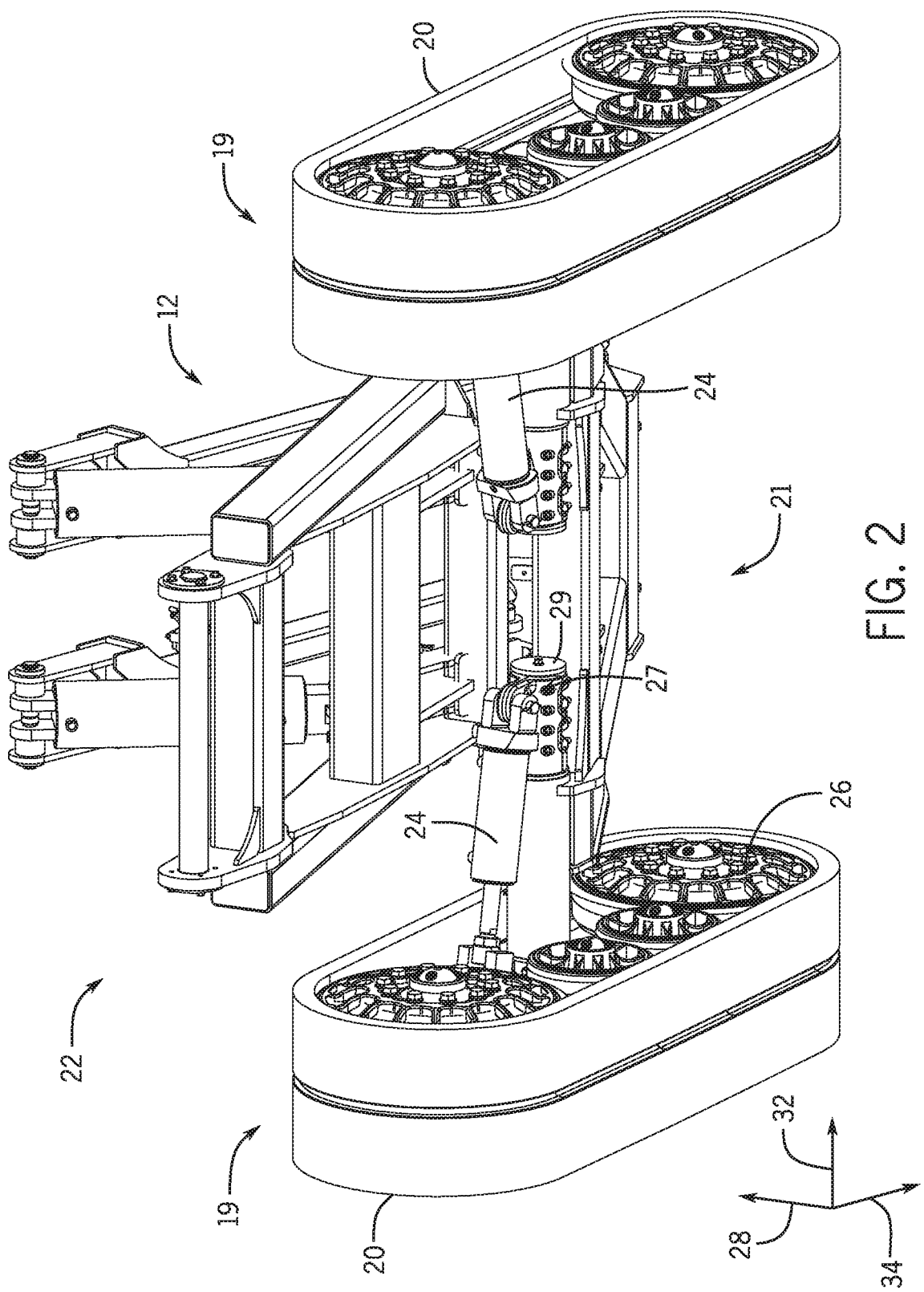
FIG. 2 is a perspective view of a lower portion of the agricultural implement of FIG. 1 that includes the track assembly, in accordance with an embodiment of the present disclosure.

FIG. 2 is a perspective view of a lower portion 22 of the agricultural implement 10 of FIG. 1 that includes the track assembly 12, in accordance with an embodiment of the present disclosure. As illustrated, the frame 14 is attached to left and right tracks 19. However, it should be noted that in some embodiments, just one track 19 may be used, while in other embodiments more than two tracks 19 may be used with the disclosed techniques. The track assembly 12 also includes a steering system 21 that is configured to steer the tracks 19 by rotating the tracks 19 about a vertical axis 28 local to each track 19. The steering system 21 may include one or more controllers, hydraulic tubes, valves, and/or actuating cylinders 24. As depicted, the track assembly 12 includes left and right actuating cylinders 24 each connected to a frame 26 of a respective track 19 at a steering mount and a cap end of each cylinder may couple to a steering cylinder anchor 27 or a tang of an actuator. Each track 19 may also include a pivot member and a pivot shaft 29 coupled to the pivot member that enables the track 19 to pivot in a variety of directions. The pivot shaft may be inserted through a tubular member of a frame of the track assembly 12. The actuating cylinders 24 may be each couple between a respective pivot shaft and a frame of the track 19. Further, the actuating cylinders 24 may be pivotal with the pivot shaft 29. Each pivot member is mounted to a respective frame of the tracks 19 to permit pivotal steering movement in a clockwise or counter-clockwise direction under the influence of the actuating cylinders 24. Further detail related to the actuating cylinders 24 mounting arrangement that enables movement of the respective tracks 19 about a local vertical axis 28, lateral axis 32, and/or longitudinal axis 34, is described in U.S. patent application Ser. No. 15/093,094 ("Implement Steerable Track Assembly Pivotable About Three Axes" filed Apr. 7, 2016) and Ser. No. 15/093,085 ("Implement Steerable Track Assembly With Pivoting Steering Actuator" filed Apr. 7, 2016), which are incorporated by reference in their entirety for all purposes.

Also, in certain embodiments, the controller is configured to control the respective actuating cylinders 24 to rotate the respective tracks 19 about the local vertical axis 28 for each track 19 to enable steering of the agricultural implement 10. As such, the track assembly 12 enables a broad range of motion of the tracks 19, and in some instances, the tracks 19 may move independently of each other using the disclosed techniques. Such movement may enable the track assembly 12 to account for variations in the terrain when the agricultural implement 10 traverses uneven terrain and/or encounters obstacles on the terrain.

Figure 3:
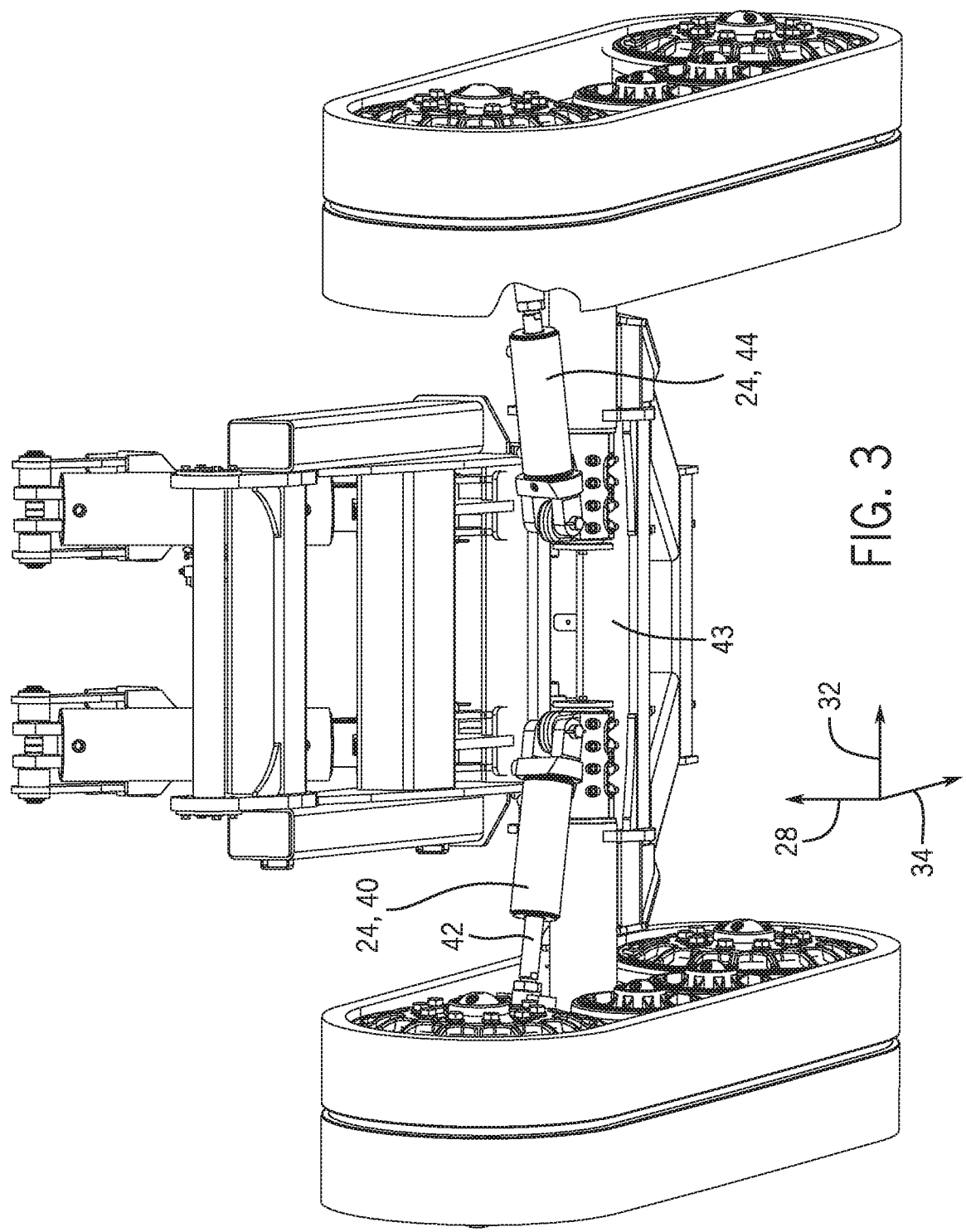
FIG. 3 is a perspective view of the track assembly of FIG. 2 pivoted about a vertical axis via actuating cylinders of a steering system, in accordance with an embodiment of the present disclosure.

FIG. 3 is a perspective view of the track assembly 12 of FIG. 2 pivoted about the local vertical axis 28 via the actuating cylinders 24 of the steering system 21, in accordance with an embodiment of the present disclosure. As depicted, a rod 42 of the right actuating cylinder 24, 40 is substantially fully extended, thereby orienting the right track 19 about the local vertical axis 28 at an angle relative to a track assembly frame 43. Also, a rod of the left actuating cylinder 24, 44 is substantially fully retracted, thereby orienting the left track 19 about the local vertical axis 28 at the same angle relative to the track assembly frame 43.

Figure 4:
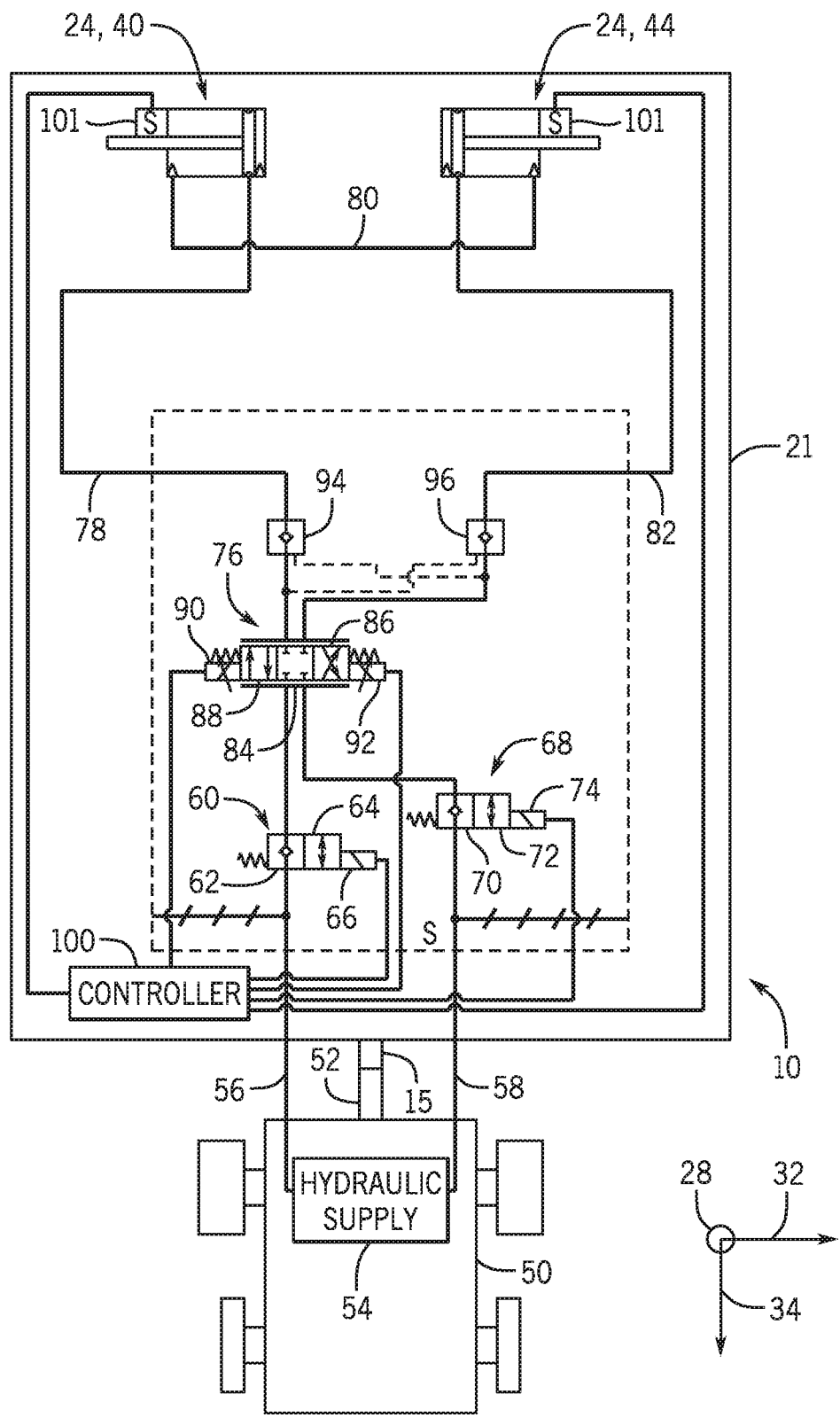
FIG. 4 is a schematic diagram of an embodiment of a steering system configured to control the track assembly by controlling fluid flow to the actuating cylinders, in accordance with an embodiment of the present disclosure.

FIG. 4 is a schematic diagram of an embodiment of a steering system 21 configured to control the track assembly 12 by controlling fluid flow to the actuating cylinders 40 and 44, in accordance with an embodiment of the present disclosure. As previously discussed, the implement 10 is configured to be towed by an agricultural vehicle, such as the illustrated tractor 50. In the illustrated embodiment, the towed implement 10 is not self-powered. That is, the implement 10 does not have its own power supply (e.g., for the steering system 21) and the tractor 50 provides power (e.g., hydraulic power) to the implement and moves the implement through the field. In alternative embodiments, the implement may be self-powered (e.g., the implement may include a power supply and/or a drive system). In the illustrated embodiment, the tow hitch 15 of the implement 10 is coupled to a corresponding hitch 52 of the tractor 50. The interface (e.g., ball, clevis, etc.) between hitches 15 and 52 facilitates rotational movement between the implement 10 and the tractor 50, thereby reducing the turning radius of the tractor/implement system.

In the present embodiment, the tractor 50 includes a hydraulic supply 54 configured to supply pressurized hydraulic fluid to the actuating cylinders 40 and 44, and/or other actuators within the implement 10. As illustrated, a first fluid supply conduit 56 and a second fluid supply conduit 58 extend between the hydraulic supply 54 and the implement 10. The hydraulic supply 54 is configured to selectively supply pressurized fluid to either the first conduit 56 or the second conduit 58. The conduit 56 or 58 not receiving pressurized fluid serves as a return to convey fluid back to the hydraulic supply 54. In certain embodiments, the hydraulic supply 54 includes a manually operated four-position valve configured to direct the pressurized fluid to either the first conduit 56 or the second conduit 58. For example, a first position of the valve to direct hydraulic fluid to the first conduit 56, a second position of the valve may direct hydraulic fluid to the second conduit 58, a third or neutral position may block hydraulic fluid flow to both conduits 56 and 58, and a fourth position may dump the hydraulic pressure. In such embodiments, an operator within the tractor 50 may control the flow of hydraulic fluid to the implement 10.

As illustrated, the first conduit 56 is fluidly coupled to a first selection control valve 60 of the steering system 21. In the present embodiment, the first selection control valve 60 is a two-position/two-way hydraulic valve. The first position 62 is configured to block fluid flow from the hydraulic supply 54 to the actuating cylinders 40 and 44 while facilitating fluid flow from the cylinders 40 and 44 to the supply 54, and the second position 64 facilitates fluid flow in both directions. An electronic actuator 66 (e.g., solenoid) controls the position of the first selection control valve 60. Similarly, a second selection control valve 68 is fluidly coupled to the second conduit 58. In the present embodiment, the second selection control valve 68 is a two-position/two-way hydraulic valve. The first position 70 is configured to block fluid flow from the hydraulic supply 54 to the actuating cylinders 40 and 44 while facilitating fluid flow from the cylinders 40 and 42 to the supply 54, and the second position 72 facilitates fluid flow in both directions. An electronic actuator 74 (e.g., solenoid) controls the position of the second selection control valve 68.

As illustrated, both the first and second fluid supply conduits 56 and 58 extend from the first and second selection control valves 60 and 68 to a steering control valve 76. In addition, a first fluid control conduit 78 extends between the steering control valve 76 and the first actuating cylinder 40. As illustrated, the first fluid control conduit 78 is fluidly coupled to the cap end of the first actuating cylinder 40. A second fluid control conduit 80 extends from the first actuating cylinder 40 to the second actuating cylinder 44. As illustrated, the second fluid control conduit 80 is fluidly coupled to the rod end of the first actuating cylinder 40 and the rod end of the second actuating cylinder 44. In this configuration, when hydraulic fluid is supplied to the first fluid control conduit 78, the cap end of the first cylinder 40 and the rod end of the second cylinder 44 (via the fluid flow through the second fluid control conduit 80 from the rod end of the first cylinder 40 to the rod end of the second cylinder 44) are pressurized. Consequently, the piston rod of the first cylinder 40 extends and the piston rod of the second cylinder 44 retracts, thereby initiating a right turn. Also, a third fluid control conduit 82 extends between the steering control valve 76 and the actuating cylinder 44. As illustrated, the third fluid control conduit 82 is fluidly coupled to the cap end of the second actuating cylinder 44. In this configuration, when hydraulic fluid is supplied to the third fluid control conduit 82, the cap end of the second cylinder 44 and the rod end of the first cylinder 40 (via the fluid flow through the second fluid control conduit 80 from the rod end of the second cylinder 44 to the rod end of the first cylinder 40) are pressurized. Consequently, the piston rod of the second cylinder 44 extends and the piston rod of the first cylinder 40 retracts, thereby initiating a left turn.

In the present embodiment, the steering control valve 76 is a three-position/four-way hydraulic valve. The first position 84 blocks flow between the first and second fluid supply conduits 56 and 58 and the first and third fluid control conduits 78 and 82, the second position 86 facilitates fluid flow between the first conduit 56 and the fifth conduit 82 and between the second conduit 58 and the third conduit 78, and the third position 88 facilitates fluid flow between the first conduit 56 and the third conduit 78 and between the second conduit 58 and the fifth conduit 82. The steering control valve 76 also includes two actuators 90 and 92 configured to adjust the position of the valve 76. In the present embodiment, the first actuator 90 is a solenoid configured to drive the steering control valve 76 to the third position 88, and the second actuator 92 is a solenoid configured to drive the valve 76 to the second position 86.

In the illustrated embodiment, the first fluid control conduit 78 includes a first pilot operated check valve 94, and the third fluid control conduit 82 includes a second pilot operated check valve 96. The pilot operated check valves are configured to facilitate fluid flow in one direction, while blocking flow in the opposite direction. However, if a pilot line extending to the valve is pressurized, the valve facilitates flow in both directions. In the present embodiment, the first pilot operated check valve 94 is configured to facilitate fluid flow from the steering control valve 76 to the actuating cylinder 40, while blocking fluid flow from the actuating cylinder 40 to the control valve 76. In addition, the pilot line of the first check valve 94 is in fluid communication with the third fluid control conduit 82. In this configuration, if the third fluid control conduit 82 is pressurized, the first pilot operated check valve 94 facilitates fluid flow from the actuating cylinder 40 to the steering control valve 76.

Furthermore, the second pilot operated check valve 96 is configured to facilitate fluid flow from the steering control valve 76 to the actuating cylinder 44, while blocking fluid flow from the actuating cylinder 44 to the control valve 76. In addition, the pilot line of the second check valve 96 is in fluid communication with the first fluid control conduit 78. In this configuration, if the first fluid control conduit 78 is pressurized, the second pilot operated check valve 96 facilitates fluid flow from the actuating cylinder 44 to the steering control valve 76. As discussed in detail below, the pilot operated check valves 94 and 96 serve to maintain fluid pressure within the actuating cylinders 40 and 44 while the steering control valve 76 is in the first position 84.

The illustrated steering system 21 also includes a controller 100. The controller 100 is communicatively coupled to the actuators 66, 74, 90, and 92. The controller 100 is configured to operate the steering system 21 in one of three modes. The first mode locks the tracks 19 into an orientation substantially aligned with a longitudinal axis of the implement 10. The second and third modes enable manual steering of the tracks 19 via operator control of the hydraulic supply 54 within the tractor 50 to make left and right turns. For example, when the steering control valve 76 is in the second position 86 (e.g., second mode) and the hydraulic supply 54 pressurizes the first fluid supply conduit 56, the piston rod of the second actuating cylinder 44 may extend and the piston rod of the first actuating cylinder 40 may retract and a left turn is initialized. Alternatively, when the steering control valve 76 is in the third position 88 (e.g., third mode) and the hydraulic supply 54 pressurizes the first fluid supply conduit 56, the piston rod of the first actuating cylinder 40 may extend and the piston rod of the second actuating cylinder 44 may retract and a right turn is initialized. Also, when the steering control valve is in the second position 86 (e.g., second mode) and the hydraulic supply 54 pressurizes the second fluid supply conduit 58, the piston rod of the first actuating cylinder 40 may extend and the piston rod of the second actuating cylinder 44 may retract and a right turn is initialized. Alternatively, when the steering control valve 76 is in the third position 88 (e.g., third mode) and the hydraulic supply 54 pressurizes the second fluid supply conduit 58, the piston rod of the second actuating cylinder 44 may extend and the piston rod of the first actuating cylinder 40 may retract and a left turn is initialized. In this way, right and left turns may be initiated in the second mode of operation (e.g., the steering control valve 76 is in the second position 86) and in the third mode of operation (e.g., the steering control valve is in the third position 88). Additionally or alternatively, the controller 100 may transition between the second mode of operation to perform left turns (e.g., pressurize the first fluid supply conduit 56 to the cap end of the second actuating cylinder 44 through the steering control valve 76 in the second position 86) and the third mode of operation to perform right turns (e.g., pressurize the first fluid supply conduit 56 to the cap end of the first actuating cylinder 40 through the steering control valve 76 in the third position 88).

In certain embodiments, the mode of operation may be selected by an operator through a user interface within the tractor 50. In such embodiments, the user interface communicatively coupled to the controller 100 such that the controller 100 may control operation of the implement 10 based on the operator selected mode of operation. In some embodiments, when the first mode is not selected, the controller 100 may transition between the second and third modes based on how the operator steers the tractor 50.

If the first mode of operation is selected, the controller 100 transitions the steering control valve 76 to the first position 84 via operation of the actuators 90 and 92. The controller 100 also transitions the first selection control valve 60 to the first position 62 via operation of the actuator 66, and transitions the second selection control valve 68 to the first position 70 via operation of the actuator 74. With the first and second selection control valves 60 and 68 in their respective first positions 62 and 70, fluid flow from the hydraulic supply 54 to the actuating cylinders 40 and 44 is blocked. In addition, the first position 84 of the steering control valve 76 blocks fluid flow between the first and second conduits 56 and 58 and the third and fifth conduits 78 and 82. As a result, fluid flow into and out of the actuating cylinders 40 and 44 will be substantially blocked.

However, if the tracks 19 encounter variations in the terrain (e.g., trenches, rocks, clods, etc.), the tracks 19 maybe urged to rotate. Consequently, fluid pressure may build within the cap side or rod side of the cylinders 40 and 44. In certain embodiments, the first position of the steering control valve 76 may not provide a sufficient seal to block fluid flow from the cylinders 40 and 44. As a result, the tracks 19 may oscillate as the implement 10 is pulled through a field. Consequently, the illustrated pilot operated check valves 94 and 96 are configured to substantially block fluid flow from the cylinders 40 and 44 while the hydraulic system is in the first mode of operation, thereby holding the tracks 19 in the desired orientation. Specifically, because the steering control valve 76 is in the first position 84, the hydraulic conduits 78 and 82 are substantially unpressurized. As a result, the pilot operated check valves 94 and 96 block fluid flow from the conduits 78 and 82 to the conduits 56 and 58. Such a configuration may hold the tracks 19 in an orientation substantially aligned with the longitudinal axis of the implement 10 despite variations in the terrain.

If the second mode of operation is selected, the controller 100 transitions the steering control valve 76 to the second position 86 via activation of the second actuator 92. The controller 100 also transitions the first selection control valve 60 to the second position 64 via activation of the actuator 66, and transitions the second selection control valve 68 to the second position 72 via activation of the actuator 74. With the first and second selection control valves 60 and 68 in their respective second positions 64 and 72, fluid may flow between the hydraulic supply 54 and the steering control valve 76. In addition, the second position 86 of the steering control valve 76 facilitates fluid flow between the first conduit 56 and the fifth conduit 82, and between the second conduit 58 and the third conduit 78. As a result, fluid may flow from the hydraulic supply 54 to the first cylinder 40 or to the second cylinder 44, thereby facilitating manual steering of the tracks 19 for performing left and right turns.

As previously discussed, a left turn may be initiated by extending the piston rod of the second actuating cylinder 44 and retracting the piston rod of the first actuating cylinder 40, thereby inducing the tracks 19 to rotate in a counter-clockwise direction about the local vertical axis 28. With the selection control valves 60 and 68 in their respective second positions 64 and 72 and the steering control valve 76 in the second position 86, a fluid connection is established between the first fluid supply conduit 56 and the cap end of the second actuating cylinder 44. Consequently, pressurizing the first fluid supply conduit 56 provides fluid to the cap side of the second cylinder 44, thereby extending the piston rod. As the piston rod of the second cylinder 44 extends, fluid flows from the rod end of the second cylinder 44 to the rod end of the first actuating cylinder 40 via the second fluid control conduit 80. As a result, the piston rod of the first cylinder 40 retracts.

As previously discussed, extension of the second piston rod and retraction of the first piston rod initiates a left turn. In addition, a fluid connection is established between the second fluid supply conduit 58 and the cap end of the first actuating cylinder 40. As the piston rod of the second actuating cylinder 44 extends, fluid flows from the rod end of the second cylinder 44 toward the rod end of the first cylinder 40 via the second fluid control conduit 80, thereby inducing the piston rod of the first cylinder 40 to retract. Furthermore, as the piston rod of the first actuating cylinder 40 retracts, fluid flows from the cap end of the cylinder 40 toward the hydraulic supply 54. With the third fluid control conduit 82 pressurized, the first pilot operated check valve 94 facilitates fluid flow from the cylinder 40 to the steering control valve 76, thereby enabling the hydraulic fluid to return to the hydraulic supply 54 via the second conduit 58.

Conversely, a right turn may be initiated by extending the piston rod of the first actuating cylinder 40 and retracting the piston rod of the second actuating cylinder 44, thereby inducing the tracks 19 to rotate in a clockwise direction. With the selection control valves 60 and 68 in their respective second positions 64 and 72 and the steering control valve 76 in the second position 86, a fluid connection is established between the second fluid supply conduit 58 and the cap end of the first actuating cylinder 40. Consequently, pressurizing the second fluid supply conduit 58 provides fluid to the cap side of the first cylinder 40, thereby extending the piston rod. As the piston rod of the second cylinder 44 extends, fluid flows from the rod end of the first cylinder 40 to the rod end of the second actuating cylinder 44 via the second fluid control conduit 80. As a result, the piston rod of the first cylinder 40 extends and the piston rod of the second cylinder 44 retracts.

As previously discussed, extension of the first piston rod and retraction of the second piston rod initiates a right turn. In addition, a fluid connection is established between the first fluid supply conduit 56 and the cap end of the second actuating cylinder 44. As the piston rod of the first actuating cylinder 40 extends, fluid flows from the rod end of the first cylinder 40 toward the rod end of the second cylinder 44 via the second fluid control conduit 80, thereby inducing the piston rod of the second cylinder 44 to retract. Furthermore, as the piston rod of the second actuating cylinder 44 retracts, fluid flows from the cap end of the cylinder 44 toward the hydraulic supply 54. With the first fluid control conduit 78 pressurized, the second pilot operated check valve 96 facilitates fluid flow from the cylinder 44 to the steering control valve 76, thereby enabling the hydraulic fluid to return to the hydraulic supply 54 via the first conduit 56. Consequently, pressurizing the second fluid supply conduit 58 and enabling fluid to return through the first conduit 56 induces the implement to initiate a right turn.

Conversely, if the controller 100 transitions to the third mode of operation, the steering control valve 76 transitions to the third position 88. When the steering control valve 76 is in the third position 88, a left turn may be initiated by applying fluid pressure to the second conduit 58, and a right turn may be initiated by applying fluid pressure to the first conduit 56.

In some embodiments, one or more steering position sensors 101 may be included in the steering control system 21 to detect an angle of the track 19 relative to the track assembly frame 43. As depicted, a first steering position sensor 101 may be coupled to the exterior of the first actuating cylinder 40 and a second steering position sensor 101 may be coupled to the exterior of the second actuating cylinder 44. In some embodiments, the first and second steering position sensors 101 may be located internally in the first and second actuating cylinders 40 and 44. In some embodiments, the steering position sensors 101 may be located between the steering vertical axis shaft and the track assembly frame 43, which enables the tracks 19 to rotate relative to the track assembly frame 43. The steering position sensors 101 are communicatively coupled to the controller 100 and may provide steering position feedback to the operator, as well as an indication of when the actuating cylinders 40 and 44 become out of phase by more than a threshold amount or for longer than a threshold time period (e.g., 0.5 minute, 1 minute, 2 minutes, etc.). The indication may be output by the controller 100 to a display in the agricultural vehicle 50, thereby causing the operator to turn the steering wheel to initiate re-phasing of the actuating cylinders 40 and 44. In some embodiments, the sensors 101 are non-contact potentiometers. However, the sensors 101 may include any suitable device capable of measuring a position of the tracks 19 relative to the track assembly frame 43. In some embodiments, as the tracks 19 rotate, the sensors 101 detects movement of the rod or piston of the actuating cylinders 40 and 44, and then outputs a signal indicative of the degree of rotation.

In certain embodiments, the sensors 101 are coupled to the controller 100 configured to control valving for directing hydraulic fluid to each cylinder 40 and 44 based on the output signal from the sensors 101. For example, when an operator initiates a turn, the controller 100 may cause directional control valving to apply hydraulic fluid to the hydraulic cylinders 40 and 44 until a desired angle of the tracks 19 relative to the track assembly carrier frame 43 is achieved. In this manner, the controller 100 may automatically rotate the tracks 19 to a desired angle based on output from the sensors 101.

Figure 5:
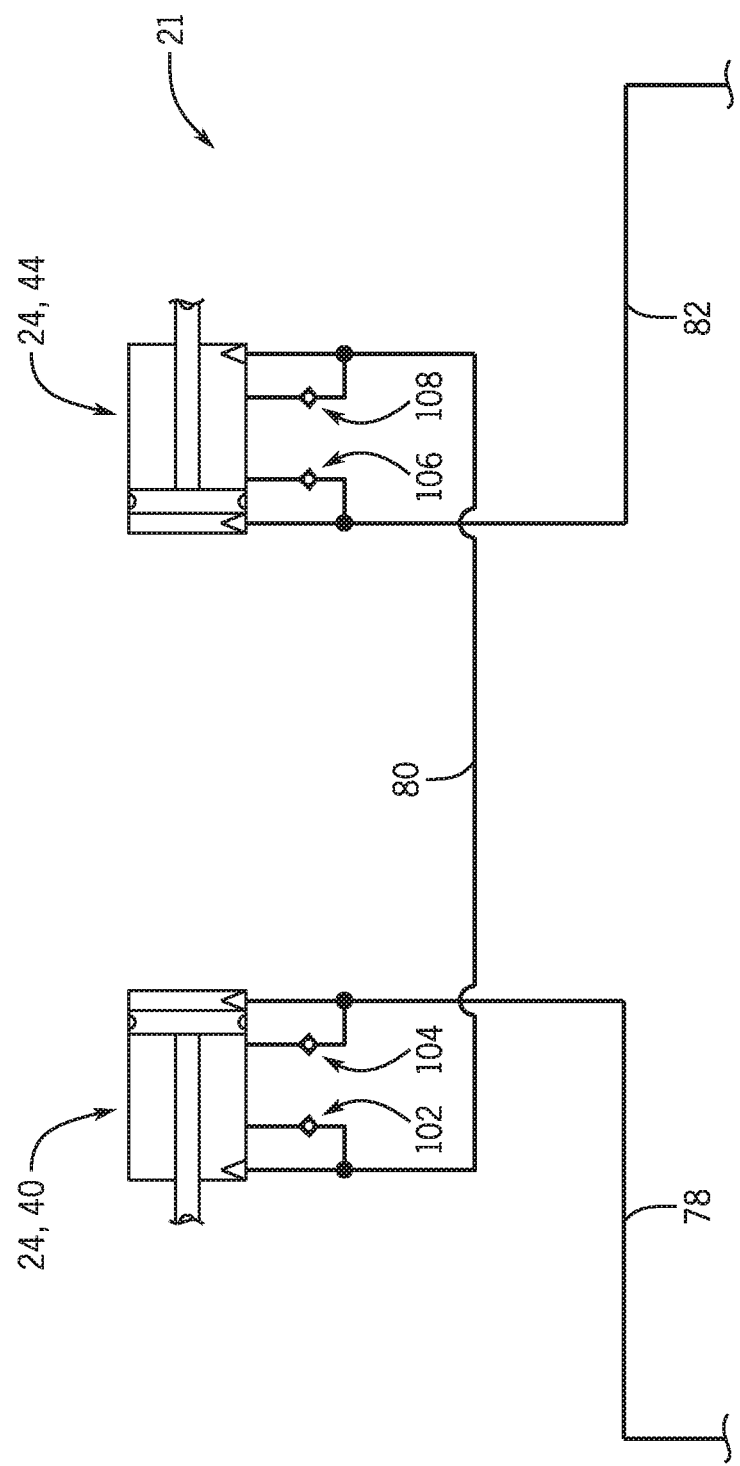
FIG. 5 is a schematic diagram of an embodiment of a portion of a steering system including, re-phasing cylinders, in accordance with an embodiment of the present disclosure.

FIG. 5 is a schematic diagram of an embodiment of a portion of the steering system 21, including re-phasing cylinders, in accordance with an embodiment of the present disclosure. As previously discussed, fluid may leak across internal seal gland(s) (e.g., of the piston) of each actuating cylinder, thereby causing the cylinders 40 and 44 to become out of phase (e.g., rod positions no longer synchronized due to leaked fluid or the like). As such, in some embodiments, the steering system 21 includes two check valves 102 and 104 fluidly coupled to the first actuating cylinder 40 and two check valves 106 and 108 fluidly coupled to the second actuating cylinder 44. The check valves 102, 104, 106, and 108 enable fluid to bypass the piston seal of the respective cylinder so pressurized fluid can replenish any leaked fluid in the hydraulic circuit (e.g., in the cap side and/or the rod side of a cylinder that is leaking). As such, the possibility of introducing air into the hydraulic circuit may be substantially reduced or eliminated, and hydraulic fluid that has leaked across the piston seal may be replenished to ensure that the cylinders remain synchronized.

For example, when the piston rod of the first actuating cylinder 40 is fully retracted, and the first fluid control conduit 78 is pressurized, the piston rod of the cylinder 40 begins to extend. The check valve 104 blocks hydraulic fluid from entering the cylinder 40 from the pressurized first fluid control conduit 78. Further, hydraulic fluid in the rod side of the cylinder 40 escapes the cylinder 40 via the second fluid control conduit 80. At this point, the check valve 102 may remain closed because the pressure is relatively equal on both sides of the check valve 102. However, when the piston passes the check valve 102, a pressure differential causes the check valve 102 to open and fluid to bypass the piston and escape through the check valve 102. The fluid replenishes fluid in the rod side of the cylinder 40, thereby increasing the pressure in the rod side. While the check valve 102 is open and the first fluid control conduit is pressurized 78, the pressure in the rod side of the cylinder 40 may increase, and the pressure in the cap side may decrease due to the flow through the valve 102, until the pressure of each side is substantially equal. As a result, the piston may not move beyond a re-phase position between the outlet to the check valve 102 and the end of the cylinder.

Further, the fluid that escapes through the check valve 102 may replenish fluid in the rod side of the cylinder 40, and fluid in the rod side of the second cylinder 44. Additionally, the fluid that fills up the rod side of the cylinder 44 causes the check valve 106 to open at a certain point and fluid to escape through the check valve 106 as the piston rod of the cylinder 44 retracts. The fluid that escapes replenishes the cap side of the cylinder 44. In this way, the first actuating cylinder 40 and the second actuating cylinder 44 may be brought back into phase by replenishing any leaked fluid in the hydraulic circuit.

In another example, when the piston rod of the first cylinder 40 is near fully extended, and the third fluid control conduit 82 is pressurized, thereby causing the second fluid control conduit 80 to be pressurized, the piston rod will retract in the first cylinder 40. The check valve 102 blocks hydraulic fluid from entering the cylinder 40 from the pressurized second fluid control conduit 80. Also, as the cap end of the piston passes the check valve 102, the check valve 102 will remain closed because the pressure is relatively equal on both sides of the check valve 102 from the cylinder 40 and the pressurized second fluid control conduit 80. Further, hydraulic fluid in the cap side of the cylinder 40 escapes the cylinder 40 via the first fluid control conduit 78.

At this point, the check valve 104 may remain closed because the pressure is relatively equal on both sides of the check valve 104. However, when the piston passes the check valve 104, a pressure differential causes the check valve 104 to open and fluid to bypass the piston and escape through the check valve 104. The fluid replenishes fluid in the cap side of the cylinder 40, thereby increasing the pressure in the cap side. While the check valve 104 is open and the second fluid control conduit is pressurized 80, the pressure in the cap side of the cylinder 40 may increase, and the pressure in the rod side may decrease due to the flow through the valve 104, until the pressure of each end is substantially equal. As a result, the piston may not move beyond a re-phase position between the outlet to the check valve 104 and the cap side of the cylinder. As such, fluid in the cap side of the cylinder 40 may be replenished. It should be understood that similar re-phasing operation may occur using the check valves 106 and 108 in the second actuating cylinder 44.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An agricultural implement system, comprising:
   a first track comprising a track frame, a pivot member, and a pivot shaft coupled to the pivot member of the first track;
   a first actuating cylinder configured to rotate the track frame of the first track relative to an implement frame, wherein the first actuating cylinder is coupled between the pivot shaft of the first track and the track frame of the first track;
   a second track comprising a track frame, a pivot member, and a pivot shaft coupled to the pivot member of the second track;
   a second actuating cylinder configured to rotate the track frame of the second track relative to the implement frame, wherein the second actuating cylinder is coupled between the pivot shaft of the second track and the track frame of the second track;
   a first fluid supply conduit configured to supply or return fluid;
   a second fluid supply conduit configured to supply or return the fluid;
   a first fluid control conduit extending to a cap end of the first actuating cylinder;
   a second fluid control conduit extending between a rod end of the first actuating cylinder and a rod end of the second actuating cylinder;
   a third fluid control conduit extending to a cap end of the second actuating cylinder;
   a steering control valve in fluid communication with the first and third fluid control conduits and the first and second fluid supply conduits, wherein the steering control valve is configured to control fluid flow from the first and second fluid supply conduits to the first and third fluid control conduits;
   a first check valve fluidly coupled to the first actuating cylinder and to the second fluid control conduit;
   a second check valve fluidly coupled to the first actuating cylinder and to the first fluid control conduit;

a third check valve fluidly coupled to the second actuating cylinder and to the third fluid control conduit; and
a fourth check valve fluidly coupled to the second actuating cylinder and to the second fluid control conduit;
wherein the first, second, third, and fourth check valves are configured to distribute the fluid to re-phase the first and second actuating cylinders; and
wherein each pivot member is mounted to a respective track frame of the first and second tracks to enable pivotal steering movement in a clockwise or counter-clockwise direction under the influence of a respective actuating cylinder of the first and second actuating cylinders.

2. The agricultural implement system of claim 1, wherein:
the first check valve is configured to distribute the fluid to re-phase the first and second actuating cylinders while a piston of the first actuating cylinder is positioned between an outlet to the first check valve and the rod end of the first actuating cylinder and the first fluid control conduit is pressurized such that the fluid in a cap side of the first actuating cylinder escapes through the first check valve to a rod side of the first actuating cylinder to equalize pressure between the rod side and the cap side of the first actuating cylinder,
the second check valve is configured to distribute the fluid to re-phase the first and second actuating cylinders while the piston of the first actuating cylinder is positioned between an outlet to the second check valve and the cap end of the first actuating cylinder and the second fluid control conduit is pressurized such that the fluid in the rod side of the first actuating cylinder escapes through the second check valve to the cap side of the first actuating cylinder to equalize pressure between the rod side and the cap side of the first actuating cylinder;
the third check valve is configured to distribute the fluid to re-phase the first and second actuating cylinders while a piston of the second actuating cylinder is positioned between an outlet to the third check valve and the cap end of the second actuating cylinder and the second fluid control conduit is pressurized such that the fluid in a rod side of the second actuating cylinder escapes through the third check valve to a cap side side of the second actuating cylinder, and
the fourth check valve is configured to distribute the fluid to re-phase the first and second actuating cylinders while the piston of the second actuating cylinder is positioned between an outlet to the fourth check valve and the rod end of the second actuating cylinder and the third fluid control conduit is pressurized such that the fluid in the cap side of the second actuating cylinder escapes through the fourth check valve to the rod side of the second actuating cylinder to equalize pressure between the rod side and the cap side of the second actuating cylinder.

3. The agricultural implement system of claim 1, wherein the steering control valve comprises a three-position valve having a first position configured to block fluid flow between the first and third fluid control conduits and the first and second fluid supply conduits, a second position configured to facilitate fluid flow between the first fluid supply conduit and the third fluid control conduit and between the second fluid supply conduit and the first fluid control conduit, and a third position configured to facilitate fluid flow between the first fluid supply conduit and the first fluid control conduit and between the second fluid supply conduit and the third fluid control conduit.

4. An agricultural implement system, comprising:
a first track comprising a track frame, a pivot member, and a pivot shaft coupled to the pivot member of the first track;
a first actuating cylinder configured to rotate the track frame of the first track relative to an implement frame, wherein the first actuating cylinder is coupled between the pivot shaft of the first track and the track frame of the first track;
a second track comprising a track frame, a pivot member, and a pivot shaft coupled to the pivot member of the second track;
a second actuating cylinder configured to rotate the track frame of the second track relative to the implement frame, wherein the second actuating cylinder is coupled between the pivot shaft of the second track and the track frame of the second track;
a first fluid supply conduit configured to supply or return fluid;
a second fluid supply conduit configured to supply or return the fluid;
a first fluid control conduit extending to a cap end of the first actuating cylinder;
a second fluid control conduit extending between a rod end of the first actuating cylinder and a rod end of the second actuating cylinder;
a third fluid control conduit extending to a cap end of the second actuating cylinder; and
a steering control valve in fluid communication with the first and third fluid control conduits and the first and second fluid supply conduits, wherein the steering control valve is configured to control fluid flow from the first and second fluid supply conduits to the first and third fluid control conduits; and
a controller, a first steering position sensor communicatively coupled to the controller, and a second steering position sensor communicatively coupled to the controller;
wherein each pivot member is mounted to a respective track frame of the first and second tracks to enable pivotal steering movement in a clockwise or counter-clockwise direction under the influence of a respective actuating cylinder of the first and second actuating cylinders;
wherein the first steering position sensor is configured to output a first signal to the controller indicative of a first angle of the track frame of the first track relative to the implement frame, the second steering position sensor is configured to output a second signal to the controller indicative of a second angle of the track frame of the second track relative to the implement frame; and
wherein the controller is configured to determine whether the first and second actuating cylinders are out of phase based at least in part on the first and second signals, the controller is configured to output a third signal indicative of the first and second angles to a user interface, or a combination thereof.

5. An agricultural implement system, comprising:
a first track comprising a track frame, a pivot member, and a pivot shaft coupled to the pivot member of the first track;
a first actuating cylinder configured to rotate the track frame of the first track relative to an implement frame, wherein the first actuating cylinder is coupled between the pivot shaft of the first track and the track frame of the first track;

a second track comprising a track frame, a pivot member, and a pivot shaft coupled to the pivot member of the second track;

a second actuating cylinder configured to rotate the track frame of the second track relative to the implement frame, wherein the second actuating cylinder is coupled between the pivot shaft of the second track and the track frame of the second track;

a first fluid supply conduit configured to supply or return fluid;

a second fluid supply conduit configured to supply or return the fluid;

a first fluid control conduit extending to a cap end of the first actuating cylinder;

a second fluid control conduit extending between a rod end of the first actuating cylinder and a rod end of the second actuating cylinder;

a third fluid control conduit extending to a cap end of the second actuating cylinder; and a steering control valve in fluid communication with the first and third fluid control conduits and the first and second fluid supply conduits, wherein the steering control valve is configured to control fluid flow from the first and second fluid supply conduits to the first and third fluid control conduits; and wherein each pivot member is mounted to a respective track frame of the first and second tracks to enable pivotal steering movement in a clockwise or counter-clockwise direction under the influence of a respective actuating cylinder of the first and second actuating cylinders; and a first pilot operated check valve fluidly coupled to the first fluid control conduit, wherein the first pilot operated check valve is configured to block fluid flow from the cap end of the first actuating cylinder to the steering control valve unless a fluid pressure within the third fluid control conduit exceeds a first threshold value; and a second pilot operated check valve fluidly coupled to the third fluid control conduit, wherein the second pilot operated check valve is configured to block fluid flow from the cap end of the second actuating cylinder to the steering control valve unless a fluid pressure within the first fluid control conduit exceeds a second threshold value.

* * * * *